United States Patent
Ishishita et al.

(10) Patent No.: US 8,647,765 B2
(45) Date of Patent: Feb. 11, 2014

(54) METHOD OF MANUFACTURING A BATTERY PACK TO MINIMIZE CIRCULATING CURRENT

(75) Inventors: Teruo Ishishita, Toyota (JP); Yuji Nishi, Toyota (JP); Keiji Kaita, Toyota (JP); Masaru Takagi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/501,329

(22) PCT Filed: Apr. 25, 2011

(86) PCT No.: PCT/JP2011/002424
§ 371 (c)(1),
(2), (4) Date: Apr. 11, 2012

(87) PCT Pub. No.: WO2012/147121
PCT Pub. Date: Nov. 1, 2012

(65) Prior Publication Data
US 2012/0276440 A1 Nov. 1, 2012

(51) Int. Cl.
*H01M 10/02* (2006.01)
*H01M 2/10* (2006.01)

(52) U.S. Cl.
USPC .................................. 429/158; 29/407.1

(58) Field of Classification Search
USPC .................................. 429/158; 29/407.1
See application file for complete search history.

(56) References Cited

U.S. PATENT DOCUMENTS

| 4,707,420 A | * | 11/1987 | Wedlake | 429/11 |
| 2009/0273235 A1 | * | 11/2009 | Ichikawa | 307/9.1 |

FOREIGN PATENT DOCUMENTS

| JP | 5-240890 A | | 9/1993 | |
| JP | 10-117447 A | | 5/1998 | |
| JP | 2001-297801 A | | 10/2001 | |
| JP | 2004-111242 A | | 4/2004 | |
| JP | 2004-328902 A | | 11/2004 | |
| JP | 2006-67683 A | | 3/2006 | |
| JP | 2006067683 | * | 3/2006 | H02J 7/00 |
| JP | 2008-260346 A | | 10/2008 | |
| JP | 2009-4349 A | | 1/2009 | |

* cited by examiner

*Primary Examiner* — Carlos Barcena
*Assistant Examiner* — Michael Dignan
(74) *Attorney, Agent, or Firm* — Sughrue Mion, PLLC

(57) ABSTRACT

A battery pack has a plurality of assembled batteries connected in parallel. Each of the assembled batteries has a plurality of cells connected electrically. A circulating current in each of the assembled batteries is calculated from an open circuit voltage of the assembled battery that varies according to the number of the cells connected in series, a value indicating a charge state of the assembled battery that varies according to the number of the cells connected in parallel, and an internal resistance of the assembled battery. The number of the cells connected in parallel and the number of the cells connected in series in each of the assembled batteries are numbers determined under the condition that the circulating current should not exceed an allowable current value for the assembled battery.

7 Claims, 3 Drawing Sheets

METHOD OF MANUFACTURING A BATTERY PACK TO MINIMIZE CIRCULATING CURRENT

CROSS REFERENCE TO RELATED APPLICATIONS

This application is a National Stage of International Application No. PCT/W2011/002424 filed on Apr. 25, 2011, the contents of all of which are incorporated herein by reference in their entirety.

TECHNICAL FIELD

The present invention relates to a battery pack including a plurality of assembled batteries connected electrically in parallel.

BACKGROUND ART

A battery pack including a plurality of assembled batteries connected electrically in parallel is known. For example, Patent Document 1 discloses a battery pack in which two types of assembled batteries having different characteristics are connected electrically in parallel. The characteristics of the assembled battery include the characteristic of the tendency of open circuit voltage to drop in association with a reduction in SOC (State Of Charge).

PRIOR ART DOCUMENTS

Patent Documents

[Patent Document 1] Japanese Patent Laid-Open No. 2008-260346
[Patent Document 2] Japanese Patent Laid-Open No. 2004-328902
[Patent Document 3] Japanese Patent Laid-Open No. 2004-111242
[Patent Document 4] Japanese Patent Laid-Open No. 5(1993)-240890
[Patent Document 5] Japanese Patent Laid-Open No. 2001-297801
[Patent Document 6] Japanese Patent Laid-Open No. 2009-004349

SUMMARY OF THE INVENTION

Problems to be Solved by the Invention

In connecting a plurality of assembled batteries electrically in parallel, a circulating current may flow through the assembled batteries. Depending on the configuration of the battery pack, the circulating current flowing through the assembled batteries may exceed an allowable current value for the assembled batteries.

Means for Solving The Problems

According to a first aspect, the present invention provides a battery pack including a plurality of assembled batteries connected in parallel, wherein each of the assembled batteries has a plurality of cells connected electrically. A circulating current in each of the assembled batteries is calculated from an open circuit voltage of the assembled battery, the open circuit voltage varying according to the number of the cells connected in series, a value indicating a charge state of the assembled battery, the value varying according to the number of the cells connected in parallel, and an internal resistance of the assembled battery. The number of the cells connected in parallel and the number of the cells connected in series in each of the assembled batteries are numbers determined under the condition that the circulating current should not exceed an allowable current value for the assembled battery.

The power of the battery pack can be used for calculating the circulating current. The power of the battery pack can be a power higher than a required power. In a system which uses the output of the battery pack to operate an electronic device, the required power is the power of the battery pack necessary for causing the electronic device to perform desired operation.

A motor generator can be used as the electronic device, for example. The motor generator can convert the electric energy output from the battery pack into kinetic energy for running of a vehicle. The required power can be a power appropriate for a preset running pattern of the vehicle.

A value indicating a charge state can be set between an upper limit value and a lower limit value used in charge and discharge control of the assembled battery. SOC (State Of Charge) [%] which is the value indicating the charge state represents a ratio of remaining capacity (Ah) to full charge capacity (Ah).

According to a second aspect, the present invention provides a method of manufacturing a battery pack having a plurality of assembled batteries connected in parallel, each of the assembled batteries including a plurality of cells, the method including first to third steps. In the first step, a circulating current in each of the assembled batteries is calculated from an open circuit voltage of the assembled battery, the open circuit voltage varying according to the number of the cells connected in series, a value indicating a charge state of the assembled battery, the value varying according to the number of the cells connected in parallel, and an internal resistance of the assembled battery. In the second step, the number of the cells connected in parallel and the number of the cells connected in series are determined in each of the assembled batteries under the condition that the circulating current should not exceed an allowable current value for the assembled battery. In the third step, each of the assembled batteries is assembled by using the cells, the number of the cells being the number determined in the second step.

Effect of the Invention

According to the first and second aspects of the present invention, even when the plurality of assembled batteries are connected in parallel, it is possible to prevent a circulating current exceeding the allowable current value from flowing through the assembled batteries.

MODE FOR CARRYING OUT THE INVENTION

Figure 1:
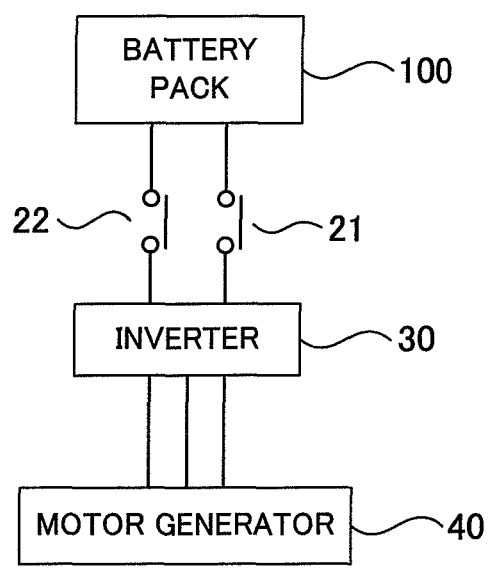
FIG. 1 is a diagram showing the configuration of a battery system.

An embodiment of the present invention will hereinafter be described.
Embodiment 1
A battery system which is Embodiment 1 of the present invention will be described with reference to FIG. 1. The battery system according to the present Embodiment can be mounted on a vehicle.

A battery pack 100 is connected to an inverter 30 through relays 21 and 22. The relays 21 and 22 are switched between ON state and OFF state in response to a control signal from a controller (not shown). When the relays 21 and 22 are ON state, the power output from the battery pack 100 is supplied to the inverter 30, or the power output from the inverter 30 is supplied to the battery pack 100.

While the power of the battery pack 100 is supplied to the inverter 30 in the present embodiment, the present invention is not limited thereto. For example, a booster circuit can be placed between the battery pack 100 and the inverter 30. The booster circuit can boost the output voltage of the battery pack 100 and supply the power after the boost of the voltage to the inverter 30. The booster circuit can also drop the output voltage of the inverter 30 and supply the power after the drop of the voltage to the battery pack 100.

The inverter 30 converts the direct-current power output from the battery pack 100 into alternating-current power and outputs the power to a motor generator 40. A three-phase alternating-current motor can be used as the motor generator 40. The motor generator 40 receives the alternating-current power from the inverter 30 and produces kinetic energy for running the vehicle. The kinetic energy produced by the motor generator 40 is transferred to wheels.

In decelerating or stopping the vehicle, the motor generator 40 converts kinetic energy generated in braking of the vehicle into electric energy. The alternating-current power produced by the motor generator 40 is supplied to the inverter 30 which then converts the alternating-current power into direct-current power. The battery pack 100 can receive the direct-current power from the inverter 30 and store the regenerative energy.

Figure 2:
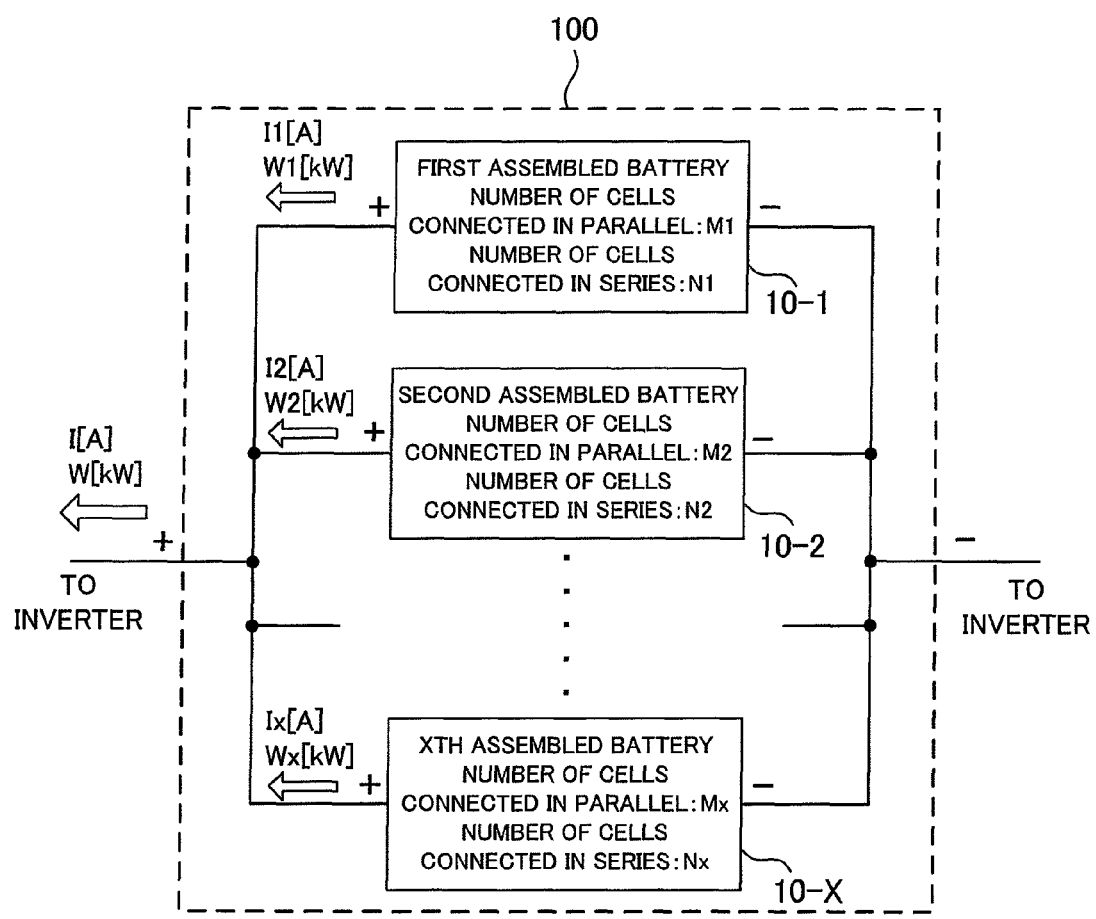
FIG. 2 is a diagram showing the configuration of a battery pack.
Figure 3:
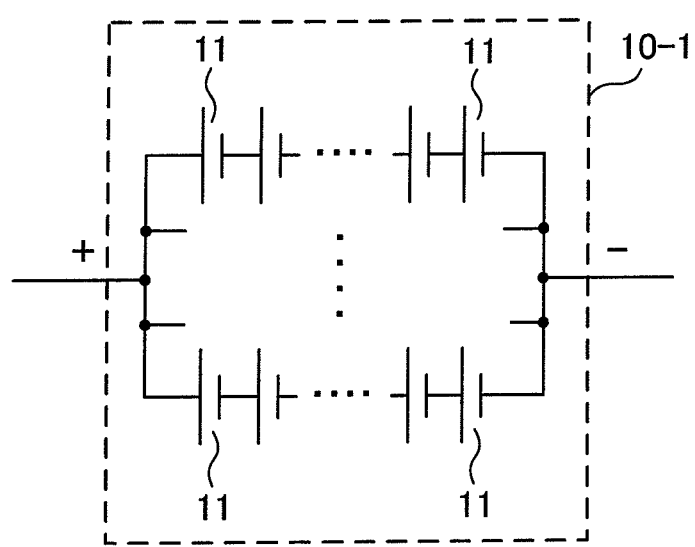
FIG. 3 is a diagram showing the configuration of an assembled battery.

FIG. 2 is a diagram showing the configuration of the battery pack 100. The battery pack 100 has X assembled batteries 10-1 to 10-X which are connected electrically in parallel. The number X of the assembled batteries is an integer equal to or larger than two. FIG. 3 is a diagram showing the configuration of the assembled battery.

The first assembled battery 10-1 can be formed of cells 11 connected electrically in series and cells 11 connected electrically in parallel. A secondary battery such as a nickel metal hydride battery and a lithium-ion battery can be used as the cell 11. The form of the cell 11 can be set as appropriate.

In the cell 11 of a so-called cylindrical type, an electric-generating element is housed within a cell case formed in cylindrical shape. In the cell 11 of a so-called square type, an electric-generating element is housed within a cell case formed in rectangular shape. The electric-generating element is an element for performing charge and discharge. The electric-generating element can be formed of a positive electrode plate, a negative electrode plate, and a separator (including an electrolytic solution) placed between the positive electrode plate and the negative electrode plate. The positive electrode plate has a collector plate and a positive electrode active material layer formed on a surface of the collector plate. The negative electrode plate has a collector plate and a negative electrode active material layer formed on a surface of the collector plate.

In the first assembled battery 10-1, the number of the cells 11 connected in parallel is set to Ml, whereas the number of the cells 11 connected in series is set to N1. Each of Mi and N1 is an integer equal to or larger than one. When M1 is one, the first assembled battery 10-1 consists only of the cells 11 connected in series. When N1 is one, the first assembled battery 10-1 consists only of the cells 11 connected in parallel. When both of M1 and N1 are one, the first assembled battery 10-1 consists of only one cell 11.

Similarly to the first assembled battery 10-1, the second assembled battery 10-2 can be formed of cells 11 connected electrically in series and cells 11 connected electrically in parallel. In the second assembled battery 10-2, the number of the cells 11 connected in parallel is set to M2, whereas the number of the cells 11 connected in series is set to N2. Each of M2 and N2 is an integer equal to or larger than one.

Similarly to the first assembled battery 10-1, the Xth assembled battery 10-X can be formed of cells 11 connected electrically in series and cells 11 connected electrically in parallel. In the Xth assembled battery 10-X, the number of the cells 11 connected in parallel is set to Mx, whereas the number of the cells 11 connected in series is set to Nx. Each of Mx and Nx is an integer equal to or larger than one.

The numbers M1 to Mx and N1 to Nx of the cells 11 in the assembled batteries 10-1 to 10-X can be determined with a method described later.

In the configuration shown in FIG. 2, the power W [kW] of the battery pack 100 is represented by the following expression (1) where discharge (output) of the battery pack 100 is represented by a positive value and charge (input) of the battery pack 100 is represented by a negative value.

$$W(t) = V(t) \times I(t) \qquad (1)$$
$$= V(t) \times (I1(t) + I2(t) + \cdots + (Ix(t))$$

In the expression (1), W(t) represents the power of the battery pack 100 at time t. V(t) represents a terminal voltage of the battery pack 100 at time t, and I(t) represents a current value flowing through the battery pack 100 at time t. I1(t) to Ix(t) indicate current values flowing through the assembled batteries 10-1 to 10-X at time t, respectively.

The voltage V(t) of the battery pack 100 is represented by the following expression (2).

$$V(t) = Vo1(t) - I1(t) \times R1(TB1(t), t) \qquad (2)$$
$$= Vo2(t) - I2(t) \times R2(TB2(t), t)$$
$$\vdots$$
$$= Vox(t) - Ix(t) \times Rx(TBx(t), t)$$

In the expression (2), Vo1(t) to Vox(t) represent the electromotive voltages (open circuit voltages) of the assembled batteries 10-1 to 10-X at time t, respectively. The electromotive voltages Vo1 to Vox of the assembled batteries 10-1 to 10-X are determined from the product of the numbers N1 to Nx of the cells 11 connected in series and the electromotive voltages (open circuit voltages) of the cells 11 connected in series.

R1 to Rx indicate internal resistances of the assembled batteries 10-1 to 10-X at time t, respectively. The internal resistances R1 to Rx are represented as functions of time t and temperatures TB1(t) to TBx(t). The temperatures TB1(t) to TBx(t) indicate the temperatures of the assembled batteries 10-1 to 10-X at time t, respectively. Specifying time t and the temperatures TB1(t) to TBx(t) can specify the internal resistances R1 to Rx. The relationship between the internal resistances R1 to Rx and the temperatures TB1 to TBx can be predefined.

When the expression (2) is transformed and substituted into the expression (1), the following expression (3) is given.

$$W = (Vo1 - I1 \times R1) \times \left\{ I1 + \frac{(Vo2 - Vo1 + I1 \times R1)}{R2} + \frac{(Vox - Vo1 + I1 \times R1)}{Rx} \right\} \quad (3)$$

In the expression (3), the variable for time t is omitted. The variable for time t is also omitted in expressions described below.

The expression (3) can be represented by the following expression (4).

$$\begin{aligned} W = & (Vo1 - I1 \times R1) \times \left[ R1 \times \left( \frac{1}{R1} + \frac{1}{R2} + \cdots + \frac{1}{Rx} \right) \times I1 + \right. \\ & \left. \left\{ \frac{(Vo2 - Vo1)}{R2} + \cdots + \frac{(Vox - Vo1)}{Rx} \right\} \right] \\ = & (Vo1 - I1 \times R1) \times \left\{ R1 \times \sum \frac{1}{Ri} \times I1 + \right. \\ & \left. \left( \sum \frac{Voi}{Ri} - Vo1 \times \sum \frac{1}{Ri} \right) \right\} \end{aligned} \quad (4)$$

In the expression (4), an index i is a value from one to x and corresponds to the assembled batteries 10-1 to 10-X. When the expression (4) is represented as the function of I1, the following expression (5) is given.

$$R1^\wedge 2 \times \left( \sum \frac{1}{Ri} \right) \times I1^\wedge 2 - \\ R1 \times \left\{ Vo1 \times \sum \frac{1}{Ri} - \left( \sum \frac{Voi}{Ri} - Vo1 \times \sum \frac{1}{Ri} \right) \right\} \times I1 + \\ \left\{ W - Vo1 \times \left( \sum \frac{Voi}{Ri} - Vo1 \times \sum \frac{1}{Ri} \right) \right\} = 0 \quad (5)$$

As shown in the following expression (6), α, β, and γ are set.

$$\alpha = R1^\wedge 2 \times \sum \frac{1}{Ri} \quad (6)$$

$$\beta = -R1 \times \left\{ Vo1 \times \sum \frac{1}{Ri} - \left( \sum \frac{Voi}{Ri} - Vo1 \times \sum \frac{1}{Ri} \right) \right\}$$

$$\gamma = W - Vo1 \times \left( \sum \frac{Voi}{Ri} - Voi \times \sum \frac{1}{Ri} \right)$$

When the expression (6) is substituted into the expression (5), the following expression (7) is given.

$$\alpha \times I1^\wedge 2 + \beta \times I1 + \gamma = 0 \quad (7)$$

When the solution to I1 is determined from the expression (7), the expression (8) is given.

$$I1 = \frac{\{\beta - (\beta^\wedge 2 - 4\alpha\gamma)^\wedge 0.5\}}{2\alpha} \quad (8)$$

When the relation expression shown in the expression (2) is substituted into the expression (8), the following expression (9) is given.

$$Ix = \frac{\left[ Vox - Vo1 + \frac{\{\beta - (\beta^\wedge 2 - 4\alpha\gamma)^\wedge 0.5\} \times R1}{2\alpha} \right]}{Rx} \quad (9)$$

When the expression (9) is used, the current values of the assembled batteries 10-1 to 10-X can be specified. When X is one in the expression (9), the expression (8) is given.

The internal resistances R1 to Rx of the assembled batteries 10-1 to 10-X can be specified by specifying the temperature of the battery pack 100. As described in the expression (2), since the internal resistances R1 to Rx are represented as the functions of the temperatures TB1 to TBx, specifying the temperatures TB1 to TBx can specify the internal resistances R1 to Rx. The temperatures TB1 to TBx of the assembled batteries 10-1 to 10-X can be specified as appropriate in view of the use environment for the battery pack 100. When the internal resistances R1 to Rx can be specified, α can be calculated on the basis of the expression (6).

The electromotive voltages Vo1 to Vox of the assembled batteries 10-1 to 10-X can be specified by specifying the SOC (State Of Charge) of the assembled batteries 10-1 to 10-X. Since the SOC and the electromotive voltage have a correspondence, the electromotive voltage can be specified from the SOC by previously determining the data representing the correspondence between the SOC and the electromotive voltage. When the SOC and the electromotive voltages Vo1 to Vox in the assembled batteries 10-1 to 10-X can be specified, β can be calculated on the basis of the expression (6).

SOC1(t) to SOCx(t) of the assembled batteries 10-1 to 10-X can be calculated on the basis of the following expression (10).

$$SOCi(t + \Delta t) = SOCi(t) - Ii(t) \times \frac{\Delta t}{3600} \times \frac{100}{CAPi \times Mi \times \mu i} \quad (10)$$

In the expression (10), an index i is a value from one to x and corresponds to the assembled batteries 10-1 to 10-X. SOCi(t) represents the SOC of the assembled battery at time t, and SOCi (t+Δt) represents the SOC of the assembled battery after the lapse of time Δt. CAPi indicates the full charge capacity of the assembled battery, Mi indicates the number of the cells 11 connected in parallel in each of the assembled batteries 10-1 to 10-X, and μ indicates a deterioration coefficient which determines the deterioration state (specifically, capacity deterioration) of each of the assembled batteries 10-1 to 10-X. The deterioration coefficient μ is a value between zero and one, for example, and can be predetermined on the basis of experiments or the like.

In the expression (10), when SOC1(0) to SOCx(0) of the assembled batteries 10-1 to 10-X at the initial state (at time t=0) are previously determined, SOC1(t) to SOCx(t) of the assembled batteries 10-1 to 10-X after the lapse of an arbitrary time Δt can be calculated. The expression (10) includes the variable Mi, and the SOC calculated on the basis of the expression (10) varies according to the number Mi of the cells 11 connected in parallel.

In charge and discharge control of the assembled batteries 10-1 to 10-X, the charge and discharge of the assembled batteries 10-1 to 10-X are controlled such that the SOC of each of the assembled batteries 10-1 to 10-X is changed within a range from predefined upper to lower limit values. Thus, in setting the SOC of each of the assembled batteries 10-1 to 10-X, the SOC needs to be set within the range from the upper to lower limit values.

On the other hand, when the power W of the battery pack 100 is set in the expression (6), the value of γ can be specified. The power W of the battery pack 100 is equal to the total sum of powers W1 to Wx of the assembled batteries 10-1 to 10-X.

The power (specifically, the output) W of the battery pack 100 needs to be higher than a predefined required power (required output). The required output is determined on the basis of a predefined running pattern of vehicle (referred to as a target running pattern). The target running pattern represents changes in vehicle speed on a time axis. When the target running pattern is predetermined, the power (required output) of the battery pack 100 appropriate for the target running pattern can be specified. For achieving the running according to the target running pattern, the power (output) W of the battery pack 100 needs to be higher than the required output of the battery pack 100.

The power (output) W of the battery pack 100 satisfying the required output needs to be lower than an output limit value. The output limit value of the battery pack 100 is equal to the total sum of the output limit values of the assembled batteries 10-1 to 10-X. As represented by the following expression (11), the output limit values WOUT1 to WOUTx of the assembled batteries 10-1 to 10-X can be specified by using a predetermined map WOUT_MAP. The map is provided for each of the assembled batteries 10-1 to 10-X.

$$WOUTi(t) = WOUT\_MAPi(TBi(t), SOCi(t)) \quad (11)$$

In the expression (11), an index i indicates a value from one to x and corresponds to the assembled batteries 10-1 to 10-X. The output limit values of WOUT1 to WOUTx of the assembled batteries 10-1 to 10-X depend on the temperatures TB1 to TBx and the SOC1 to SOCx in the assembled batteries 10-1 to 10-X. Thus, when the temperatures TB1 to TBx and the SOC1 to SOCx are specified, the output limit values WOUT1 to WOUTx in the assembled batteries 10-1 to 10-X can be specified by using the map WOUT_MAP.

When the values of α, β, and γ, and the internal resistances R1 to Rx, and the electromotive voltages Vo1 to Vox of the assembled batteries 10-1 to 10-X are substituted into the expression (9), the current values I1 to Ix of the assembled batteries 10-1 to 10-X can be calculated.

The circulating current flowing through the battery pack 100 is the current flowing through the assembled batteries 10-1 to 10-X when the total current of the battery pack 100 is equal to zero. The circulating current has the relationship described in the following expression (12).

$$Ik = -\Sigma Ii (i=1 \sim k-1, k+1 \sim x) \quad (12)$$

In the expression (12), Ik indicates the current value flowing through a particular assembled battery. The right side of the expression (12) indicates the total sum of the values of the current flowing through all of the assembled batteries except the particular assembled battery.

The current values I1 to Ix satisfying the condition of the expression (12) can be particularly specified on the basis of the expression (12). Since a plurality of combinations are present for the particularly specified current values I1 to Ix, the maximum and minimum values of each of the current values I1 to Ix are specified from the plurality of combinations. For example, since the current value Ix may take a plurality of numeric values, the maximum and minimum values can be specified from these numeric values.

The maximum value of each of the current values I1 to Ix has the relationship shown by the following expression (13).

$$Ii\_max \leq Idi\_lim \quad (13)$$

In the expression (13), an index i indicates a value from one to X and corresponds to the assembled batteries 10-1 to 10-X. Ii_max is the maximum value of a plurality of values when the current value Ii can take those values. Idi_lim is a continuous allowable discharge current in each of the assembled batteries 10-1 to 10-X. The continuous allowable discharge current varies according to the configuration (especially, the number of the cells 11 connected in parallel) of the assembled batteries 10-1 to 10-X.

The minimum value of each of the current values I1 to Ix has the relationship shown by the following expression (14).

$$Ii\_min \geq Ici\_lim \quad (14)$$

In the expression (14), an index i indicates a value from one to X and corresponds to the assembled batteries 10-1 to 10-X. Ii_min is the minimum value of a plurality of values when the current value Ii can take those values. Ici_lim is a continuous allowable charge current in each of the assembled batteries 10-1 to 10-X. The continuous allowable charge current varies according to the configuration (especially, the number of the cells 11 connected in parallel) of the assembled batteries 10-1 to 10-X.

When the minimum value Ii_min and the continuous allowable charge current Ici_lim have negative values in the expression (14), the expression (14) can be represented by the following expression (15).

$$|Ii\_min| \leq |Ici\_lim| \quad (15)$$

The current value Ii of the assembled battery can be determined such that the maximum value Ii_max is smaller than the continuous allowable discharge current Idi_lim and that the minimum value Ii_min is larger than the continuous allowable charge current Ici_lim. In other words, the value which can be taken by the current value Ii can be set such that the discharge current of each assembled battery does not exceed the continuous allowable discharge current of each assembled battery and that the charge current of each assembled battery does not exceed the continuous allowable charge current of each assembled battery. The maximum value Ii_max is set to be smaller than the continuous allowable discharge current Idi_lim and the minimum value Ii_min is set to be larger than the continuous allowable charge current Ici_lim, thereby making it possible to prevent a current exceeding the allowable value from flowing through the assembled batteries 10-1 to 10-X.

When the current values I1 to Ix of the assembled batteries 10-1 to 10-X are specified so that the expression (13) and the expression (14) are satisfied, the numbers M1 to Mx of the cells 11 connected electrically in parallel can be specified on the basis of the expression (10). M1 to Mx may take a plurality of values.

When the electromotive voltages Vo1 to Vox of the assembled batteries 10-1 to 10-X are specified, the numbers N1 to Nx of the cells 11 connected electrically in series can be specified in the assembled batteries 10-1 to 10-X. Specifically, the electromotive voltage of the cell 11 can be previously measured, and the electromotive voltages Vo1 to Vox of the assembled batteries 10-1 to 10-X are divided by the electromotive voltage of the cell 11 to allow the calculation of the numbers N1 to Nx of the cells 11 connected electrically in series.

When a plurality of combinations are present for the numbers M1 to Mx of the cells 11 connected electrically in parallel and the numbers Ni to Nx of the cells 11 connected electrically in series, the numbers M1 to Mx and N1 to Nx of the cells 11 can be determined in view of the configuration of the battery pack 100. When the smallest value is selected for the numbers M1 to Mx and N1 to Nx of the cells 11, the cost of the battery pack 100 can be reduced.

Once M1 to Mx and N1 to Nx can be determined, the configuration of each of the assembled batteries 10-1 to 10-X can be specified on the basis of M1 to Mx and N1 to Nx. By way of example, for assembling the assembled battery 10-1, M1 cells 11 are connected in parallel and N1 cells 11 are connected in series. For electrically connecting the plurality of cells 11, a bas bar or an electric cable can be used.

The processing of calculating M1 to Mx and N1 to Nx can be performed by a computer. Specifically, parameters necessary for calculating M1 to Mx and N1 to Nx can be input to the computer to determine M1 to Mx and N1 to Nx.

In the present embodiment, the characteristics of the assembled batteries 10-1 to 10-X and the battery pack 100 vary according to the type of the cell 11. Thus, the values of M1 to Mx and N1 to Nx can be previously determined in view of the type of the cell 11. Then, the type of the cell 11 and the values of M1 to Mx and N1 to Nx in association with each other can be stored in memory. As a result, once the type of the cell 11 is specified, the values of M1 to Mx and N1 to Nx can be easily specified by referring to the information stored in the memory.

The invention claimed is:

1. A method of manufacturing a battery pack having a plurality of assembled batteries connected in parallel, each of the assembled batteries including a plurality of cells, the method comprising:
    calculating a circulating current in each of the assembled batteries from an open circuit voltage of the assembled battery, the open circuit voltage varying according to the number of the cells connected in series, a value indicating a charge state of the assembled battery, the value varying according to the number of the cells connected in parallel, and an internal resistance of the assembled battery;
    determining the number of the cells connected in parallel and the number of the cells connected in series in each of the assembled batteries under the condition that the circulating current should not exceed an allowable current value for the assembled battery; and
    assembling each of the assembled batteries by using the cells, the number of the cells being the determined number;
    wherein the circulating current calculated in the calculating operation is a current flowing through each of the assembled batteries when a total current of the battery pack is equal to zero.

2. The method of manufacturing the battery pack according to claim 1, wherein a power of the battery pack is a power higher than a required power and is used for calculating the circulating current.

3. The method of manufacturing the battery pack according to claim 2, wherein each of the assembled batteries outputs energy for use in running of a vehicle, and
    the required power is a power appropriate for a preset running pattern of the vehicle.

4. The method of manufacturing the battery pack according to claim 1, wherein the value indicating the charge state lies between an upper limit value and a lower limit value used in charge and discharge control of the assembled battery.

5. The method of manufacturing the battery pack according to claim 1, wherein each of the assembled batteries outputs energy for use in running of a vehicle.

6. A method of manufacturing a battery pack having a plurality of assembled batteries connected in parallel, each of the assembled batteries including a plurality of cells, the method comprising:
    calculating a circulating current in each of the assembled batteries from an open circuit voltage of the assembled battery, the open circuit voltage varying according to the number of the cells connected in series, a value indicating a charge state of the assembled battery, the value varying according to the number of the cells connected in parallel, and an internal resistance of the assembled battery;
    determining the number of the cells connected in parallel and the number of the cells connected in series in each of the assembled batteries under the condition that the circulating current should not exceed an allowable current value for the assembled battery; and
    assembling each of the assembled batteries by using the cells, the number of the cells being the determined number;
    wherein, in the calculating operation, the circulating current is calculated based on the following expressions (a) to (e);

$$Ix = \frac{\left[ Vox - Vo1 + \frac{\{\beta - (\beta^{\wedge}2 - 4\alpha\gamma)^{\wedge}0.5\} \times R1}{2\alpha} \right]}{Rx} \quad (a)$$

$$Ik = -\sum Ii(i = 1 \sim k-1, k+1 \sim x) \quad (b)$$

$$\alpha = R1^{\wedge}2 \times \sum \frac{1}{Ri} \quad (c)$$

$$\beta = -R1 \times \left\{ Vo1 \times \sum \frac{1}{Ri} - \left( \sum \frac{Voi}{Ri} - Vo1 \times \sum \frac{1}{Ri} \right) \right\} \quad (d)$$

$$\gamma = W - Vo1 \times \left( \sum \frac{Voi}{Ri} - Voi \times \sum \frac{1}{Ri} \right) \quad (e)$$

where $\alpha$, $\beta$, and $\gamma$ are defined by the expressions (c) to (e), respectively, $V_o$ represents the open circuit voltage of the assembled battery, R represents the internal resistance of the assembled battery, W represents an electric power of the battery pack, and indexes of I, $V_o$, and R represent numbers assigned to the assembled batteries.

7. A method of manufacturing a battery pack having a plurality of assembled batteries connected in parallel, each of the assembled batteries including a plurality of cells, the method comprising:
    calculating a circulating current in each of the assembled batteries from an open circuit voltage of the assembled battery, the open circuit voltage varying according to the number of the cells connected in series, a value indicating a charge state of the assembled battery, the value varying according to the number of the cells connected in parallel, and an internal resistance of the assembled battery;
    determining the number of the cells connected in parallel and the number of the cells connected in series in each of the assembled batteries under the condition that the circulating current should not exceed an allowable current value for the assembled battery; and
    assembling each of the assembled batteries by using the cells, the number of the cells being the determined number;

wherein, in the determining operation, the number of cells connected in parallel is determined based on the following expressions (f);

$$SOC i(t + \Delta t) = SOC i(t) - I i(t) \times \frac{\Delta t}{3600} \times \frac{100}{CAPi \times Mi \times \mu i} \tag{f}$$

where i represents number assigned to the assembled batteries, SOC represents the charge state of the assembled battery, t represents time, I represents the circulating current of the assembled battery, CAP represents full charge capacity of the assembled battery, M represents the number of cells connected in parallel, and μ represents deterioration coefficient.

* * * * *